United States Patent
Driscoll et al.

(10) Patent No.: US 9,088,562 B2
(45) Date of Patent: Jul. 21, 2015

(54) USING SERVICE REQUEST TICKET FOR MULTI-FACTOR AUTHENTICATION

(71) Applicant: INTERNATIONAL BUSINESS MACHINES CORPORATION, Armonk, NY (US)

(72) Inventors: Paul Driscoll, Church Fenton (GB); Milton H. Hernandez, Tenafly, NJ (US); Paul Jennings, Hampshire (GB); Chee Meng Low, Singapore (SG); Yaoping Ruan, White Plains, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/021,921

(22) Filed: Sep. 9, 2013

(65) Prior Publication Data

US 2015/0074784 A1 Mar. 12, 2015

(51) Int. Cl.
*G06F 7/04* (2006.01)
*H04L 9/32* (2006.01)
*H04L 29/06* (2006.01)

(52) U.S. Cl.
CPC ............. *H04L 63/0807* (2013.01); *H04L 63/08* (2013.01); *H04L 63/083* (2013.01)

(58) Field of Classification Search
CPC .... H04L 63/08; H04L 63/0807; H04L 63/083
USPC .............................. 726/9, 5, 26; 713/168, 170
See application file for complete search history.

(56) References Cited

U.S. PATENT DOCUMENTS

| | | |
|---|---|---|
| 8,037,193 B2 | 10/2011 | Hay et al. |
| 8,037,295 B2 | 10/2011 | Lin |
| 8,087,075 B2 | 12/2011 | Peterson et al. |
| 8,185,550 B1 | 5/2012 | Eichler et al. |
| 8,364,951 B2 | 1/2013 | Peterka et al. |
| 8,606,599 B1 | 12/2013 | Wong et al. |
| 8,745,718 B1 | 6/2014 | Dufel et al. |
| 8,839,400 B2 | 9/2014 | Anderson et al. |
| 2003/0061512 A1 | 3/2003 | Flurry et al. |

(Continued)

FOREIGN PATENT DOCUMENTS

| | | |
|---|---|---|
| WO | 2013104143 A1 | 7/2013 |
| WO | 2015035298 A1 | 3/2015 |

OTHER PUBLICATIONS

International Search Report and Written Opinion dated Dec. 18, 2014, regarding application PCT/US2014/054539, 10 pages.

(Continued)

*Primary Examiner* — Aravind Moorthy
(74) *Attorney, Agent, or Firm* — Yee & Associates, P.C.; Louis J. Percello

(57) ABSTRACT

In an environment wherein a front end system receives a service request, and a back end system responds to the request, a user of a target endpoint must be authenticated. A ticket ID is assigned to the service request, and responsive to an initiating action of the user, a virtual token is generated that has a specified relationship with the ticket ID. The virtual token is delivered to the user, and the user is prompted to present the token to a validating component associated with one of the front end or back end systems, wherein the validating component is configured to verify the token validity. If the token is found to be valid, the user is authenticated to access the specified target endpoint.

7 Claims, 5 Drawing Sheets

(56) References Cited

U.S. PATENT DOCUMENTS

| | | |
|---|---|---|
| 2003/0065731 A1 | 4/2003 | Mohammed et al. |
| 2003/0182242 A1 | 9/2003 | Scott et al. |
| 2004/0179654 A1 | 9/2004 | Boetje et al. |
| 2004/0187038 A1 | 9/2004 | Yachida |
| 2004/0210771 A1 | 10/2004 | Wood et al. |
| 2004/0243824 A1 | 12/2004 | Jones |
| 2004/0268151 A1 | 12/2004 | Matsuda |
| 2005/0086494 A1 | 4/2005 | Carley |
| 2005/0125677 A1 | 6/2005 | Michaelides |
| 2006/0037063 A1 | 2/2006 | Clemmons et al. |
| 2006/0200855 A1 | 9/2006 | Willis |
| 2007/0100782 A1 | 5/2007 | Reed et al. |
| 2007/0101440 A1 | 5/2007 | Bhatia et al. |
| 2007/0143826 A1 | 6/2007 | Sastry et al. |
| 2007/0283012 A1 | 12/2007 | Chu et al. |
| 2008/0168531 A1 | 7/2008 | Gavin |
| 2008/0195614 A1 | 8/2008 | Lutz et al. |
| 2009/0210285 A1 | 8/2009 | Nielsen et al. |
| 2009/0222900 A1* | 9/2009 | Benaloh et al. .................. 726/9 |
| 2010/0010848 A1 | 1/2010 | Marchman et al. |
| 2010/0100953 A1 | 4/2010 | Mowers |
| 2011/0126003 A1 | 5/2011 | Engert |
| 2011/0145907 A1 | 6/2011 | Chua |
| 2011/0289547 A1 | 11/2011 | Aggarwal et al. |
| 2011/0302132 A1* | 12/2011 | Muthuvelu .................. 707/607 |
| 2012/0023568 A1 | 1/2012 | Cha et al. |
| 2012/0222099 A1* | 8/2012 | Narendra et al. ................ 726/6 |
| 2013/0179199 A1 | 7/2013 | Ziskind et al. |
| 2013/0198038 A1 | 8/2013 | Mowatt et al. |
| 2013/0198358 A1 | 8/2013 | Taylor |
| 2013/0198827 A1 | 8/2013 | Bhaskaran |
| 2014/0090022 A1 | 3/2014 | Anderson et al. |
| 2015/0009522 A1* | 1/2015 | Caprio da Costa Junior et al. ........................... 358/1.14 |
| 2015/0074785 A1 | 3/2015 | Driscoll et al. |

OTHER PUBLICATIONS

Sestus, LLC, "An overview of the Virtual Token Multifactor Authentication product," Virtual Token Multifactor Authentication, Jan. 2013, 9 pages. http://sestus.e:om/contentluploads/sestus_virtualtoken_overview .pdf>.

Notice of allowance dated May 14, 2014, regarding U.S. Appl. No. 13/628,537, 20 pages.

Office Action dated Jan. 27, 2014, regarding U.S. Appl. No. 13/628,537, 18 pages.

Anderson et al., "Managing and Controlling Administrator Access to Managed Computer Systems," U.S. Appl. No. 13/628,537, filed Sep. 27, 2012, 28 pages.

Driscoll et al., "Using Service Request Ticket for Multi-Factor Authentication," U.S. Appl. No. 14/048,670, filed Oct. 8, 2013, 28 pages.

"Developer and Administrator Access to Production," Quest Software, Inc., copyright 2011, 12 pages. Accessed May 10, 2012, http://www.webcitation.org/67U3FkElz.

Office action dated Feb. 18, 2015, regarding U.S. Appl. No. 14/048,670, 32 pages.

Notice of Allowance dated May 4, 2015, regarding U.S. Appl. No. 14/048,670, 15 pages.

* cited by examiner

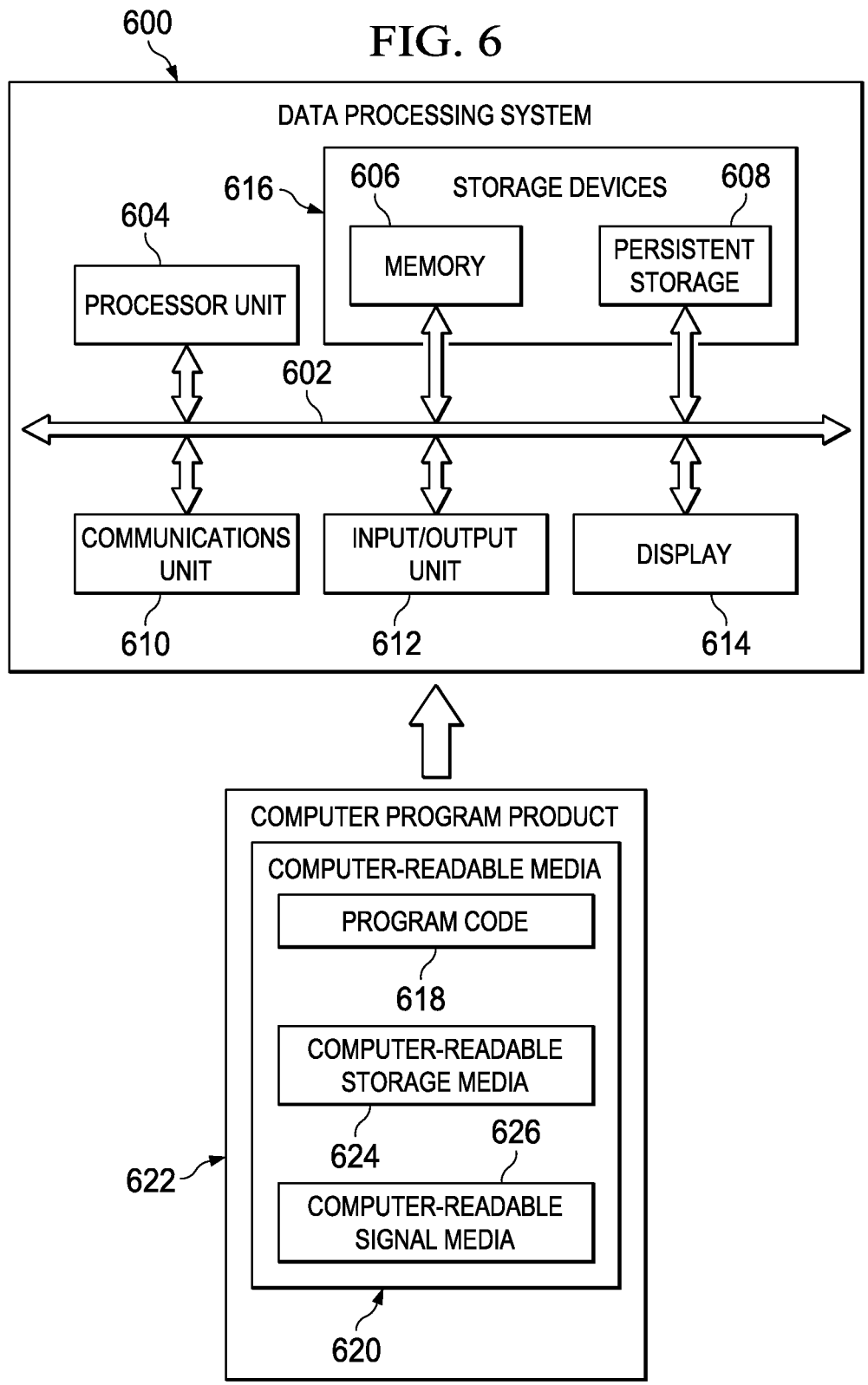

USING SERVICE REQUEST TICKET FOR MULTI-FACTOR AUTHENTICATION

BACKGROUND

1. Field

The invention disclosed and claimed herein generally pertains to a method for authenticating users of servers and other target endpoints, in an environment such as an IT service environment that includes a ticketing system for receiving service requests, and a service delivery system for responding to the requests. More particularly, the invention pertains to a method of the above type wherein a unique ticket identification code or ticket ID is assigned to a service request, and a virtual token derived from the given ticket ID is used for multi-factor authentication, such as second factor authentication.

2. Description of the Related Art

Vendors of information technology (IT) and other computer related products and services frequently make resources available to customers, such as a service ticketing system or the like, for use in resolving customer issues. These issues may include, by way of example, problems and incidents reported by customers, and customer product change requests. In order to address a particular issue, a customer may submit a service request pertaining to the issue to a ticket system of the above type. Upon receiving the service request, the ticket system assigns a ticket identifier (ID), comprising a unique numeric or alphanumeric code or the like, to the request.

A ticketing system of the above type may be referred to as a front end system, i.e., a system used by customers to interact with their vendor or service provider. After a service request has been entered and given a unique ticket ID, the request is incorporated into a ticket, which is routed to a back end system operated by one or more service staff members of the vendor or service provider. Each service staff member uses the back end system to take actions directed to resolving or complying with the ticketed service request. By assigning a unique ticket ID to the request ticket as described above, the front end ticket system can effectively manage processing of the service request by the back end system, in order to ensure that the request is responded to in a timely and satisfactory manner.

In arrangements of the above type, users of the back end system must be able to access certain servers or other resources, which typically require user authentication. Moreover, policies or regulations may require multi-factor authentication of users, such as second factor authentication. As is known by those of skill in the art, multi-factor authentication requires presentation by a user of two or more of the three currently acknowledged authentication factors. The first factor comprises something the user knows, e.g., a password or PIN. The second factor comprises something the user has, e.g., an ATM card, a smart card or a token, including virtual, software and connected and disconnected tokens. The third factor comprises something the user is, e.g., a biometric characteristic such as a fingerprint or eye retina.

In view of the above, it would be very beneficial to significantly improve or enhance the efficiency of multi-factor user authentication, and particularly second factor authentication.

SUMMARY

Embodiments of the invention provide a method and system for combining a business operation and compliance control in an IT services environment, such as the service arrangement described above. This objective may be achieved, at least in part, by making the operational management system part of the authentication or access control flow to the managed systems, in order to provide a completely closed loop control. This objective may further be realized by automatically generating a requisite second authentication factor via the ticket management system; by associating one or more second authentication factors with each service request ticket for accountability and status tracking; and/or by initiating the generation of a virtual token, which is to be used as a second authentication factor within the ticket management system.

An embodiment of the invention comprising a method is directed to a service environment wherein a front end computer system receives a service request, a back end computer system responds to the service request, and a user must be authenticated to access a specified target endpoint, in order to take action in response to the service request. The method includes the step of assigning a specified identification code to the service request. Responsive to a prespecified initiating action of the user directed to one of the front end system and the back end system, selectively, a virtual token is generated that has a specified association or relationship with the specified identification code. The method further includes delivering the virtual token to the user, and prompting the user to present the delivered virtual token to a validating component associated with at least one of the front end system and the back end system, wherein the validating component is configured to verify the validity of the delivered virtual token. Responsive to the validity of the delivered virtual token being verified, the user is authenticated to access the specified target endpoint.

BRIEF DESCRIPTION OF THE SEVERAL VIEWS OF THE DRAWINGS

FIG. 6 is a block diagram showing a computer or data processing system that may be used in implementing embodiments of the invention.

DETAILED DESCRIPTION

Figure 1:
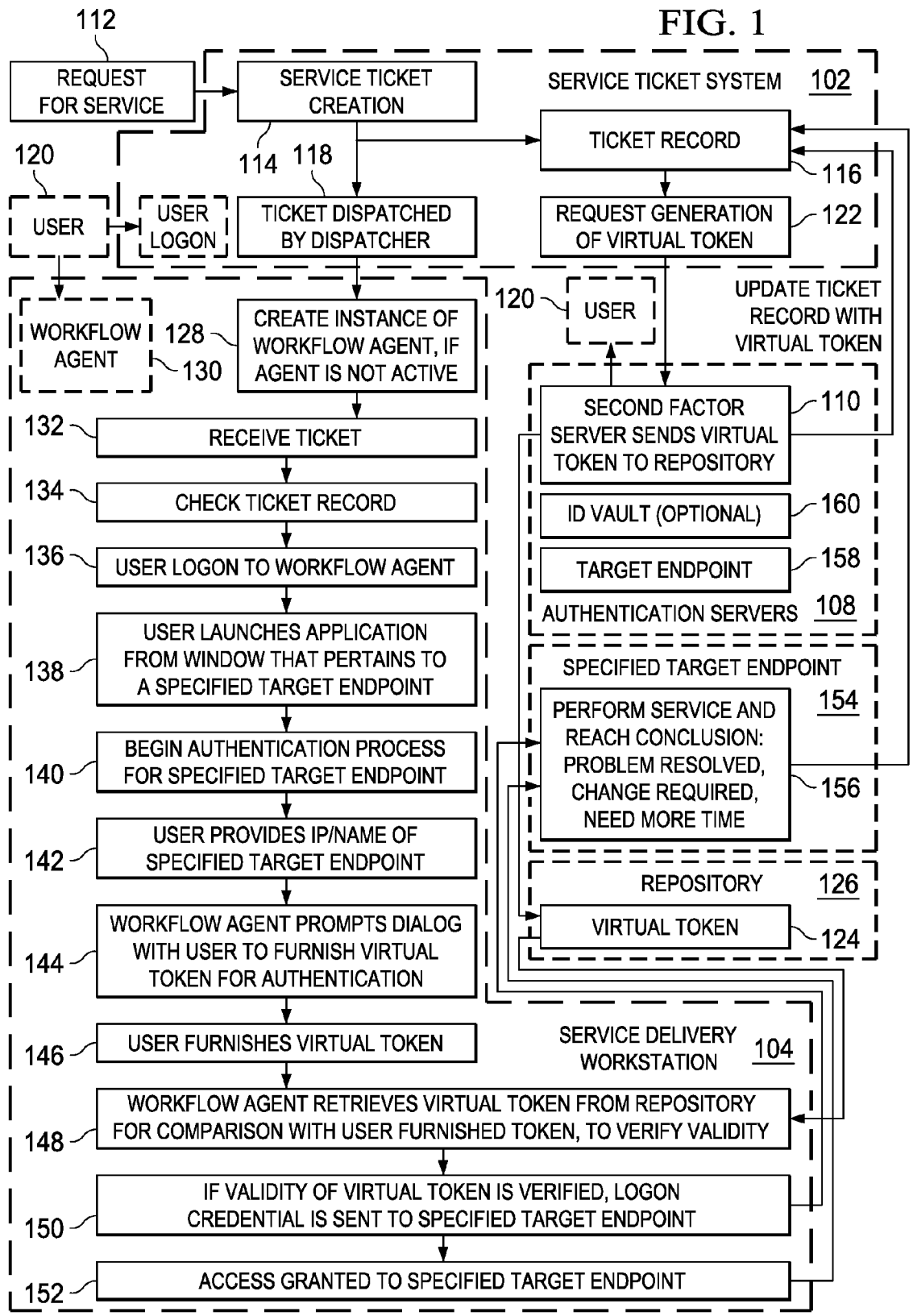
FIG. 1 is a schematic diagram that includes flowcharts for illustrating a first embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown an arrangement or configuration of systems for use in an IT services environment, which include a service ticket system 102 and a service delivery workstation 104. Ticket system 102 comprises a front end system, which is made available by a product vendor or other service provider to receive service requests from customers or others. As described above, a service request could result from a problem report, an incident report or a change request, although embodiments of the invention are not limited thereto.

Workstation 104 comprises at least part of a back end system which is used by service staff, or other users associated with the vendor or service provider, to provide an appropriate response to a given service request. More particularly, workstation 104 is employed by users to access respective target endpoints, in order to comply with, resolve or otherwise respond to a service request. The target endpoints definitely include all servers which must be accessed to resolve a given request, but may also include other resources such as databases and the like. The term "target endpoint" as used herein includes all such servers, databases and other resources, without limitation.

As described above, users needing to access servers and other target endpoints may require user authentication, such as second factor authentication. Accordingly, the arrangement of FIG. 1 is provided with authentication servers 108 for this purpose, including second factor server 110. Moreover, ticket system 102 and workstation 104 are both selectively configured in accordance with an embodiment of the invention, as described hereinafter in further detail, to significantly improve efficiency of the authentication process.

Referring further to ticket system 102, there are shown flowchart steps 114-118, which are carried out by system 102 in response to receiving a service request 112. The request 112 may be a type of service request as described above. Upon receiving the service request 112, a service ticket is created at step 114 which pertains to the request. Also, a unique ticket identification code or ID is assigned to the ticket. The ticket is then routed to a ticket record 116, which uses the assigned ticket ID to keep track of all subsequent processing and actions taken in regard to the service request. Ticket record 116 may contain information pertaining to the service request for a number of different ticket information fields. In addition to the ticket ID, these fields could include ticket type; status; approval status; approval timestamp; assignee; and ticket start and ticket end timestamps.

FIG. 1 further shows the created service request ticket routed to a dispatcher at step 118, which can send the ticket to workstation 104.

Referring further to FIG. 1, there is shown a user 120 logging onto ticket system 102 in connection with the ticket created for service request 112. In accordance with the embodiment of FIG. 1, this action of user 120 is used to initiate generation of a virtual token, which may then be used to authenticate the user in accessing one or more target end points. More particularly, when the user logs on to the ticket system 102, a component of the ticket system automatically requests generation of a virtual token, as shown by step 122. Moreover, the virtual token is configured to have a close relationship to the ticket ID. Usefully, the virtual token includes or comprises the ticket ID. Such relationships are described hereinafter in further detail, in connection with FIG. 4.

In a useful embodiment, the request to generate the virtual token is routed to second factor server 110. Server 110 then generates the virtual token, and also sends the virtual token to user 120, such as by e-mail or text message. In this embodiment, the second factor server 110 additionally sends the virtual token 124 to a repository 126, for subsequent use, and also sends the virtual token to ticket record 116.

Referring further to workstation 104, a workflow agent may currently be active. However, if the agent is not active, an instance of the workflow agent is created at 128, in response to a ticket dispatched from ticket system 102. The workflow instance comprises a sequence of workflow steps, as shown by workstation 104, which are driven by a workflow agent such as agent 130. The flow of work steps shows the ticket received at step 132, and the ticket record is checked at step 134.

At step 136, the user 120 logs on to the workflow agent instance, in order to carry out a task pertaining to the service ticket of service request 112. In response to the user logon in one embodiment of the invention, a window showing workflow steps and related applications pops up on a display of the user. In other useful embodiments of the invention, an application is passively listened for, and a corresponding workflow is associated with the application automatically, based on application signatures such as the binary name, version and checksum. The user selects an application needed to perform the task, and launches the application at step 138. However, in order to use the application, the user must have access to a specified target endpoint, such as a particular server, which requires a second factor authentication.

Accordingly, at workflow step 140 an authentication process is begun for the specified target endpoint. At step 142 the user provides the IP address and name of the specified target endpoint. At step 144, the workflow agent prompts a dialogue with the user, to furnish the virtual token for authentication. In response, the user at step 146 provides the above virtual token which she or he had previously been sent, following step 122.

At workflow step 148, the workflow agent retrieves the virtual token 124 from repository 126, and compares the retrieved token with the virtual token furnished by the user. If the two virtual tokens match exactly, the validity of the user's token is verified. In this event, a logon credential is sent to specified target endpoint 154, at workflow step 150, and the user is granted access to the specified target endpoint at step 152. The user can then use the specified target endpoint in furtherance of tasks, such as those set forth at 156, which advance or assist resolution of the service request 112.

It will be appreciated that the sequence of workflow steps shown at workstation 104 can be used iteratively, to authenticate the user in connection with each of a succession of servers or other target endpoints. Moreover, certain aspects of the embodiment of FIG. 1 can be modified, without departing from the invention thereof. For example, the target endpoint can be an authentication server, as shown by target endpoint 158. As a further option, an ID vault 160 can be included with the authentication servers, to further enhance authentication.

By providing repository 126 as shown by FIG. 1 for the virtual token 124, the virtual token can be retrieved asynchronously by workflow steps of workstation 104. However, in another aspect of the embodiment of FIG. 1, retrieval of the virtual token could comprise a workflow step which has a particular location in the sequence of workflow steps.

The embodiment of FIG. 1, as well as each of the other embodiments disclosed herein, provides a centralized audit trail of user access by recording respective access events to server endpoints, using the virtual token and mapping to the ticket record being serviced. This facilitates low-cost adherence to regulatory and/or policy requirements for service providers, and internal support organizations with large-scale and widely distributed sets of supported devices.

Figure 2:
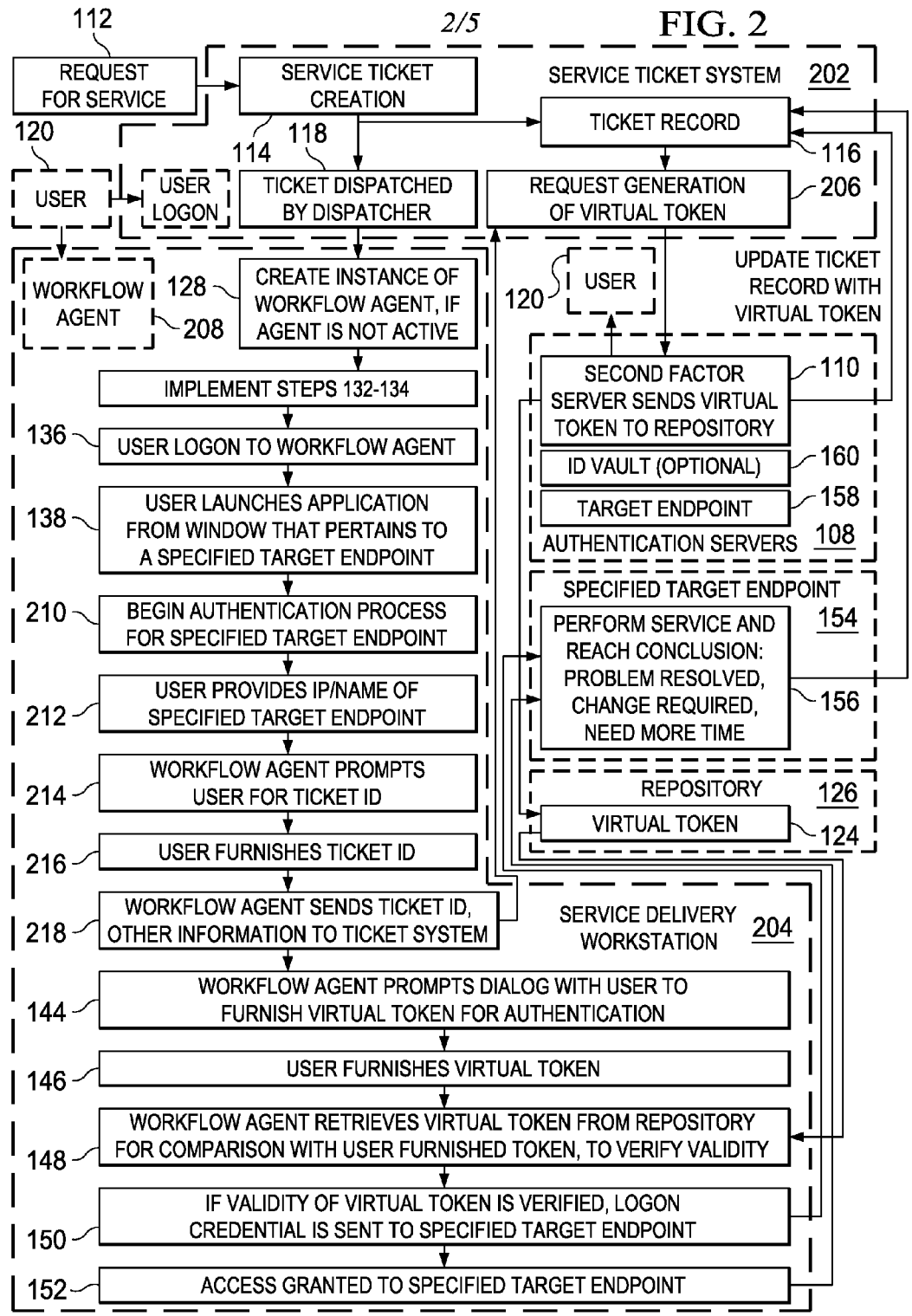
FIG. 2 is a schematic diagram that includes flowcharts for illustrating a second embodiment of the invention.

Referring to FIG. 2, there is shown an embodiment of the invention comprising a forward end service ticket system 202 and a back end workstation delivery system 204, which are largely similar to system 102 and system 104, respectively, of FIG. 1. Thus, systems 202 and 204 of FIG. 2 each contains some of the same steps or components as are respectively included in systems 102 and 104 of FIG. 1. More particularly, system 202 includes steps or components 114-118, and system 204 includes workflow sequence steps 128-138 and 144-152, as respectively described above in connection with systems 102 and 104. FIG. 2 further includes authentication servers 108 and the respective components thereof, and also the specified target endpoint 154, all as likewise described above in connection with FIG. 1.

Notwithstanding the above similarities between respective systems of FIGS. 1 and 2, there are also some important differences therebetween. For example, step 206 of system 202, for requesting generation of a virtual token, is triggered by an input that is quite different from the triggering input of step 120 to FIG. 1, as described hereinafter in further detail. Also, workflow agent 208 provides a sequence of work flow steps that includes steps not found in the workflow sequence of FIG. 1, as likewise described hereinafter in further detail.

Referring further to FIG. 2, there are shown steps 114-118 of system 202 which are responsive to a service request 112, in like manner with such steps of FIG. 1. Thus, a service ticket is created for the service request 112, a unique ticket ID is assigned to the service ticket, and ticket information is recorded at ticket record 116. The service ticket is also dispatched to workstation 204.

However, unlike the embodiment of FIG. 1, wherein generation of a virtual token is initiated by a user logging on to the ticket system, the FIG. 2 embodiment employs a different user action to initiate generation of a virtual token, for user authentication. More particularly, generation is triggered when the user seeks to log on to a specified target endpoint, by implementing certain steps of the workflow sequence of FIG. 2. Accordingly, ticket system 202 is provided with a step 206, which receives the triggering event from workstation 204, as described hereinafter. In response, step 206 routes a request to generate a virtual token for user authentication to second factor server 110. Second factor server 110 then generates a virtual token, which has a close relationship with the ticket ID, and sends the virtual token to user 120 such as by e-mail or text message. Server 110 also sends the virtual token 124 to repository 126, for subsequent use.

Referring further to workstation 204 of FIG. 2, an instance of the workflow agent 208, comprising a sequence of workflow steps, is created at step 128. Steps 132-136 are then carried out, and at step 138 the user launches an application for a specified target endpoint, which requires user authentication. This commences the authentication process of FIG. 2, which includes workflow steps 210-218.

The authentication process begins at step 210, and at step 212 the user provides the specified target name and IP address for the specified target endpoint. The workflow agent then prompts the user, at workflow step 214, for the ticket ID of the service ticket pertaining to service request 112, and the user furnishes the ticket ID at step 216. At workflow step 218, workflow agent 208 sends the ticket ID and other information to ticket system 204, wherein the other information could include the IP and name of the specified target endpoint.

The ticket ID and other information sent at step 218 is more specifically routed to step 206 of ticket system 202, and comprises the triggering event referred to above. In response, step 206 requests second factor server 110 to generate the virtual token, which is sent to the user.

At step 144 of workstation 204, the workflow agent prompts the user to furnish the virtual token, and this is done at step 146. The workflow agent then verifies the validity of the virtual token at step 148, and carries out steps 150 and 152 if the token is valid.

Figure 3:
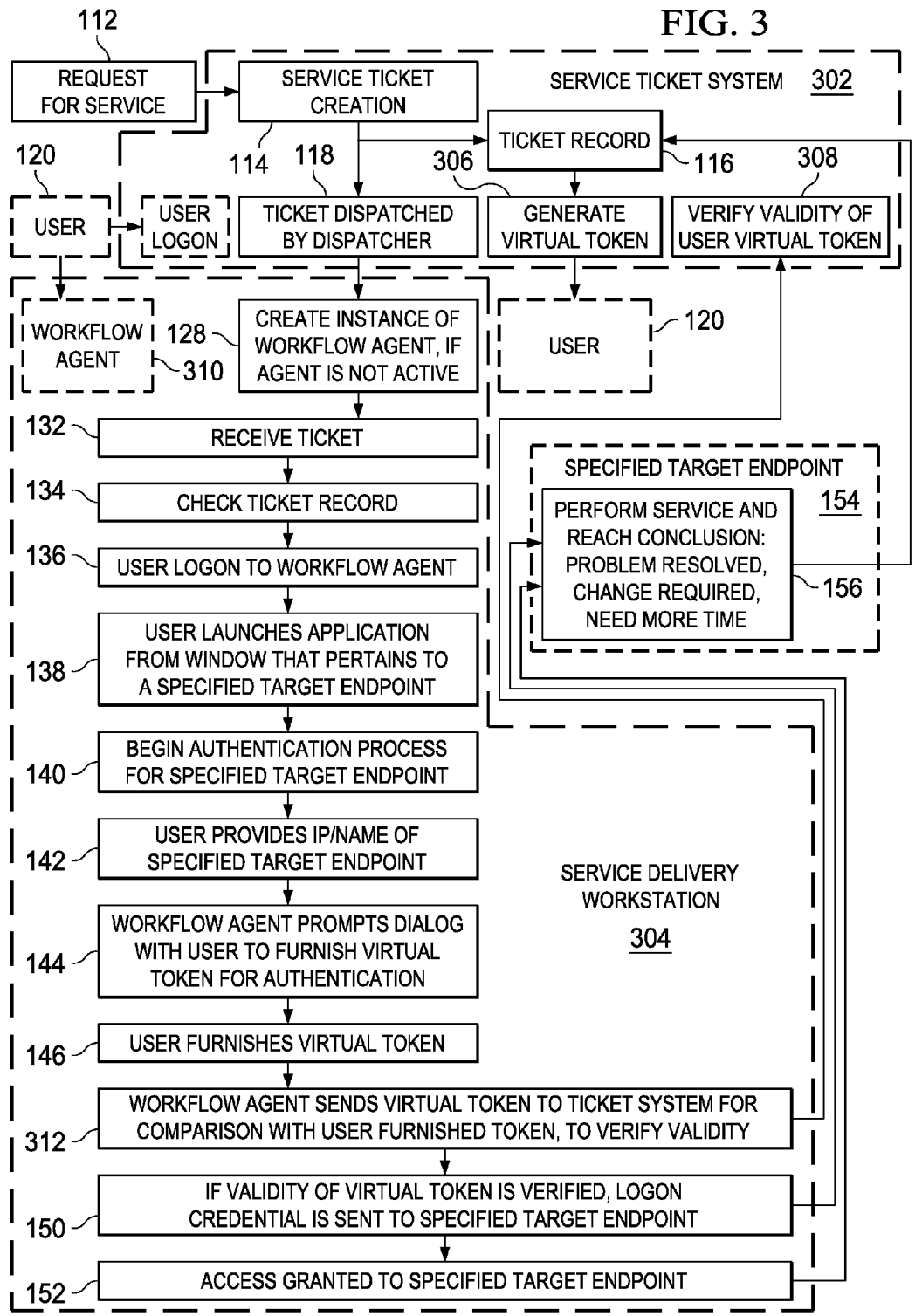
FIG. 3 is a schematic diagram that includes flowcharts for illustrating a third embodiment of the invention.

Referring to FIG. 3, there is shown an embodiment of the invention comprising a front end service ticket system 302 and a back end work station delivery system 304, which are largely similar to system 102 and system 104, respectively, of FIG. 1. Thus, systems 302 and 304 of FIG. 3 each contains some of the same steps or components as are respectively included in systems 102 and 104 of FIG. 1. More particularly, system 302 includes steps or components 114-118, and system 304 includes workflow sequence steps 128-152, as respectively described above in connection with systems 102 and 104. FIG. 3 further includes specified target endpoint 154, as likewise described above in connection with FIG. 1.

However, it will be seen from FIG. 3 that the embodiment thereof does not include any authentication servers, such as authentication server 108. Instead, the ticket system 302 functions as the second authentication factor server for the FIG. 3 embodiment. This is implemented in part by providing ticket system 302 with steps or components 306 and 308, and also by providing workstation 304 with a workflow agent 310 and a workflow step 312, as respectively described hereinafter.

Referring further to ticket system 302 of FIG. 3, steps 114-118 respectively respond to a service request 112, in like manner with such steps of FIG. 1. Thus, a service ticket is created for the service request 112, a unique ticket ID is assigned to the service ticket, and ticket information is recorded at ticket record 116. The service ticket is also dispatched to workstation 304.

FIG. 3 further shows user 120 logging on to ticket system 302, in connection with the ticket created for service request 112. This action of user 120 causes ticket system 302 to automatically generate a virtual token at step 306. As described above in connection with the embodiments of FIGS. 1 and 2, a virtual token is configured to have a close relationship with the ticket ID for the service request 112. Step 306 or other component of ticket system 302 also sends the generated virtual token to the user, such as by e-mail or text message.

Referring further to workstation 304, an instance of workflow agent 310 is created at step 128. At step 136 the user logs on to the workflow agent instance, and at step 138 the user launches an application pertaining to a specified target endpoint. This requires authentication, which begins at step 140. The workflow agent prompts the user for the virtual token at step 144, and the token is furnished at step 146.

In the embodiment of FIG. 3, the validity of the virtual token is to be verified by service ticket system 302. Accordingly, the workflow sequence of FIG. 3 is provided with a step 312, which sends the virtual token to the ticket system for validation. In addition, ticket system 302 is provided with a step or component 308, which verifies validity of the user virtual token. Thus, step 308 receives the user furnished virtual token from workstation 304, and compares it with the originally generated virtual token from step 306. If validity of the virtual token is verified, access to the specified target endpoint is granted at workflow steps 150-152.

Figure 4:
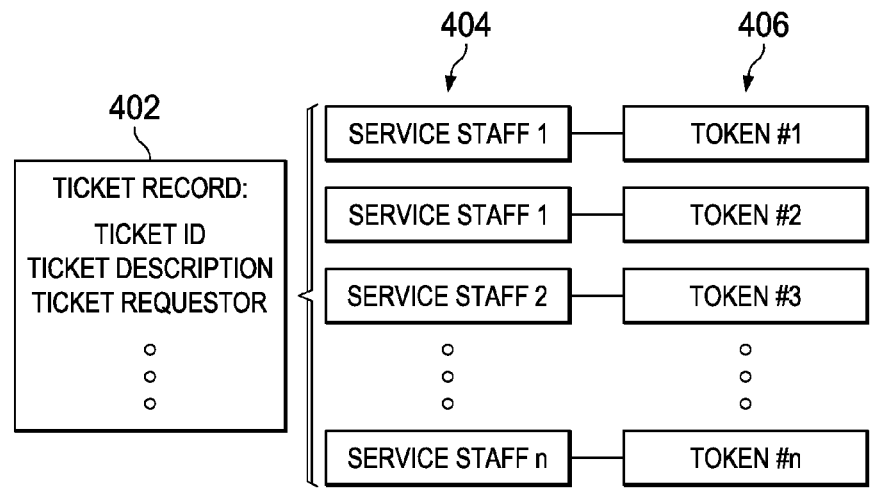
FIG. 4 is a schematic diagram showing a relationship of ticket information and tokens for an embodiment of the invention.

FIG. 4 shows a ticket record 402, which lists information that may be stored in a service ticket system such as system 102 or the like, in connection with a service ticket. Such information can include a description of the ticket and the ticket requestor, as well as the ticket ID. As described above, a virtual token generated by an embodiment of the invention usefully has a close relationship to the ticket ID of the associated service. In a simple case, where only one service staff member 404 is needed for only a single session to service the ticket, only a single virtual token would be required. In this case, the ticket ID could be used directly as the virtual token.

Referring further to FIG. 4, there is shown a mapping relationship between the ticket record 402 and respective tokens 406. Generally, servicing requirements will be more complex than the above simple case. For example, a token is typically valid for only a given period of time, which may be insufficient for a service staff member to complete the servicing task associated with the ticket. Accordingly, the service staff member will need multiple tokens to serve the ticket. This situation is illustrated in FIG. 4, by showing that the same service staff member requires two different tokens, i.e. token 1 and token 2. In order to provide uniquely different virtual tokens for this situation, token 1 and token 2 could each comprise, by way of example, a numeric code that includes both the ticket ID, and the specific time that a particular token is valid.

A further complexity can arise when multiple service staff members are needed to complete a servicing task. This will require providing each service staff member with a uniquely different virtual token, as shown by tokens 2, 3 and n of FIG. 4. In order to achieve this, each of these tokens can comprise, by way of example, a numeric code that includes both the ticket ID, and a unique identifier of the service staff member who will receive that token.

Figure 5:
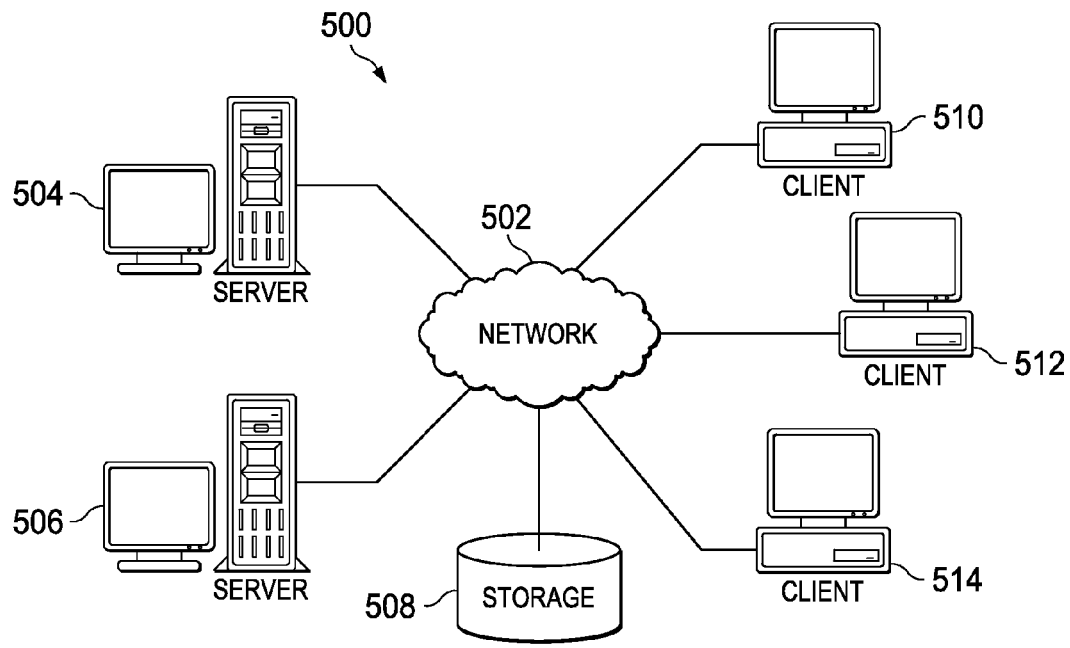
FIG. 5 is a block diagram showing a network of data processing systems in which an embodiment of the invention may be implemented.

FIG. 5 is a pictorial representation of a network of data processing systems in which illustrative embodiments of the invention may be implemented. Network data processing system 500 is a network of computers in which the illustrative embodiments may be implemented. Network data processing system 500 contains network 502, which is the medium used to provide communications links between various devices and computers connected together within network data processing system 500. Network 502 may include connections, such as wire, wireless communication links, or fiber optic cables.

In the depicted example, server computer 504 and server computer 506 connect to network 502 along with storage unit 508. In addition, client computers 510, 512, and 514 connect to network 502. Client computers 510, 512, and 514 may be, for example, personal computers or network computers. In the depicted example, server computer 504 provides information, such as boot files, operating system images, and applications to client computers 510, 512, and 514. Client computers 510, 512, and 514 are clients to server computer 504 in this example. Network data processing system 500 may include additional server computers, client computers, and other devices not shown.

Program code located in network data processing system 500 may be stored on a computer-recordable storage medium and downloaded to a data processing system or other device for use. For example, program code may be stored on a computer-recordable storage medium on server computer 504 and downloaded to client computer 510 over network 502 for use on client computer 510.

In the depicted example, network data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 500 also may be implemented as a number of different types of networks, such as, for example, an intranet, a local area network (LAN), or a wide area network (WAN). FIG. 5 is intended as an example, and not as an architectural limitation for the different illustrative embodiments.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614.

Processor unit 604 serves to process instructions for software that may be loaded into memory 606. Processor unit 604 may be a number of processors, a multi-processor core, or some other type of processor, depending on the particular implementation. "A number," as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for processing by processor unit 604. The processes of the different embodiments may be performed by processor unit 604 using computer-implemented instructions, which may be located in a memory, such as memory 606.

These instructions are referred to as program code, computer usable program code, or computer readable program code that may be read and processed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for processing by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600.

In some instances, computer readable storage media 624 may not be removable from data processing system 600. In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, a remote data processing system, or some other device capable of storing and transmitting program code 618. For example, program code stored in the computer readable storage medium in data processing system 600 may be downloaded over a network from the remote data processing system to the computer readable storage medium in data processing system 600. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In a service environment wherein a front end computer system receives a service request, a back end computer system responds to the service request, and a user must be authenticated to access a specified target endpoint to take action in response to the service request, a computer program product comprising computer executable instructions stored on a non-transitory computer recordable storage medium for execution by a computer, the computer executable instructions comprising:

instructions for assigning a specified identification code to the service request received by the front end computer system for use by the back end computer system, wherein the specified identification code is unique;

instructions responsive to a prespecified initiating action of the user pertaining to one of the front end computer system and the back end computer system, selectively, for generating a virtual token using the specified identification code wherein the virtual token has a specified relationship with the specified identification code including one of being derived from the specified identification code or comprises the specified identification code, wherein a ticket record associated with the specified identification code is updated to include the virtual token and wherein the virtual token generated is unique;

instructions for delivering the virtual token to the user, wherein the user accumulates one or more of the unique virtual tokens generated using the specified identification code;

instructions for prompting a dialog with the user to present the delivered virtual token to a validating component associated with at least one of the front end computer system and the back end computer system, wherein the validating component is configured to verify the validity of the delivered virtual token; and instructions responsive to the validity of the delivered virtual token being verified, for authenticating the user to access the specified target endpoint.

2. The computer program product of claim 1, wherein:
the front end system comprises a service ticket system that creates a ticket for the service request, the specified identification code comprises a ticket identifier (ID) assigned to the ticket, and the generated virtual token includes one of being derived from the ticket ID, or is the ticket ID, selectively and wherein the generated virtual token further comprising selectively, a unique identifier of the user who will receive the generated virtual token and a specific time the generated virtual token is valid.

3. The computer program product of claim 1, wherein:
the front end system comprises a service ticket system, and the initiating action of the user comprises the user action of logging onto the service ticket system.

4. The computer program product of claim 3, wherein:
responsive to the user logging on to the service ticket system, the service ticket system automatically requests a second authentication factor server to generate the virtual token.

5. The computer program product of claim 3, wherein:
responsive to the user logging on to the service ticket system, a component of the service ticket system generates the virtual token, and delivers the virtual token to the user.

6. The computer program product of claim 1, wherein:
the back end computer system comprises a system for creating an instance of a workflow agent, and the initiating action of the user comprises using the workflow instance in an effort to access the specified target endpoint.

7. In a service environment wherein a front end computer system receives a service request, a back end computer system responds to the service request, and a user must be authenticated to access a specified target endpoint in order to take action in response to the service request, a data processing system comprising:

a bus;
a memory connected to the bus, wherein computer executable program code is stored on the memory; and
a processor unit connected to the bus, wherein the processor unit executes the computer executable program code:
  to assign a specified identification code to the service request received by the front end computer system for use by the back end computer system, wherein the specified identification code is unique;
  responsive to a prespecified initiating action of the user pertaining to one of the front end computer system and the back end computer system, selectively, to generate a virtual token using the specified identification code wherein the virtual token has a specified relationship with the specified identification code including one of being derived from the specified identification code or comprises the specified identification code, and wherein a ticket record associated with the specified identification code is updated to include the virtual token and wherein the virtual token generated is unique;

to deliver the virtual token to the user, wherein the user accumulates one or more of the unique virtual tokens generated using the specified identification code;

to prompt a dialog with the user to present the delivered virtual token to a validating component associated with at least one of the front end computer system and the back end computer system, wherein the validating component is configured to verify the validity of the delivered virtual token; and responsive to the validity of the delivered virtual token being verified, to authenticate the user to access the specified target endpoint.

* * * * *